United States Patent [19]
Stack et al.

[11] Patent Number: 6,095,604
[45] Date of Patent: Aug. 1, 2000

[54] CHILD SEAT MOUNTING SYSTEM

[75] Inventors: Robert J. Stack, Clarkston; John M. Bederka, Sterling Heights, both of Mich.

[73] Assignee: DaimlerChrysler Corporation, Auburn Hills, Mich.

[21] Appl. No.: 09/407,524

[22] Filed: Sep. 28, 1999

[51] Int. Cl.[7] ........................................................ A47C 1/08
[52] U.S. Cl. ...................................... 297/254; 297/188.04
[58] Field of Search ............................... 297/250.1, 254, 297/188.04, 183.7, 452.18, 188.01

[56] References Cited

U.S. PATENT DOCUMENTS

| | | |
|---|---|---|
| 2,324,421 | 7/1943 | Ouellette . |
| 2,564,924 | 8/1951 | Patton . |
| 2,758,769 | 8/1956 | Nunn et al. . |
| 2,978,015 | 4/1961 | Cox . |
| 3,023,047 | 2/1962 | Linden . |
| 3,107,942 | 10/1963 | Rivkin . |
| 3,157,432 | 11/1964 | Watkins . |
| 3,992,028 | 11/1976 | Abe et al. . |
| 5,609,396 | 3/1997 | Loxton et al. . |
| 5,695,243 | 12/1997 | Anthony et al. . |
| 5,941,600 | 8/1999 | Mar et al. . |

OTHER PUBLICATIONS

Photograph "Safer Child Seat." *Crains, Automotive News*, dated Sep. 6, 1999, p. 8.

*Primary Examiner*—Milton Nelson, Jr.
*Attorney, Agent, or Firm*—Kenneth H. Maclean

[57] ABSTRACT

A vehicle seat is provided which has a cushion portion for alternately supporting a seated occupant or a bottom portion of a child seat. The vehicle seat also has a seatback portion with a rearward facing surface and a forward facing surface for alternately supporting a back region of a vehicle seat occupant or a seatback of a child seat. A connector receptacle is recess mounted into the rearwardly facing surface of the vehicle seatback to permit engagement with a connector extending from the seatback portion of a child's seatback. The connector receptacle has a bar onto which a hook of the connector attaches.

7 Claims, 3 Drawing Sheets

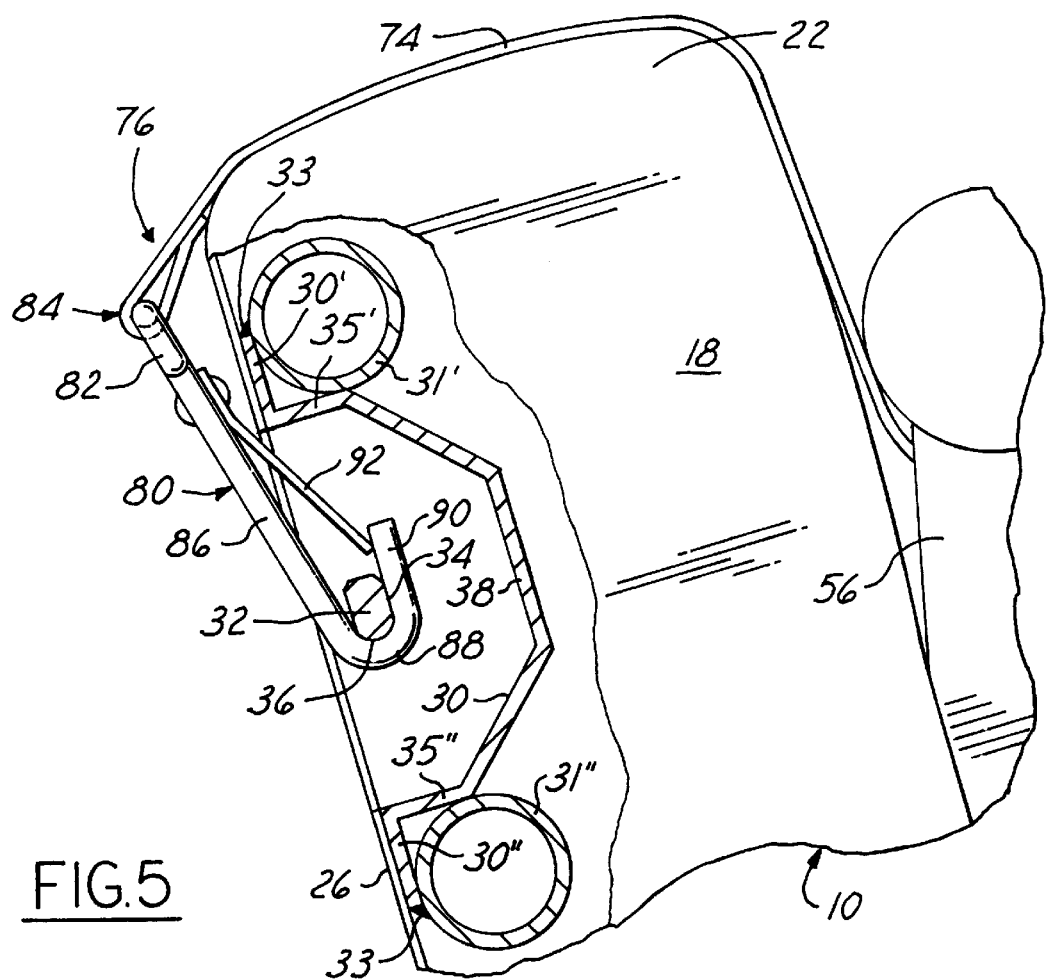
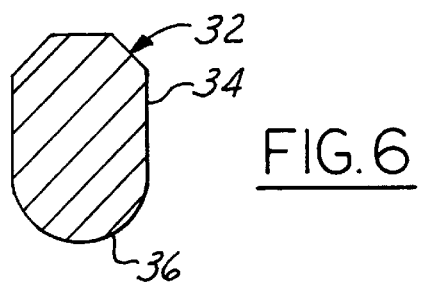

CHILD SEAT MOUNTING SYSTEM

FIELD OF THE INVENTION

The present invention relates to a system for securing a top end of a child seat to an automotive vehicle seat. In particular, the present invention relates to a tethering system that secures a top end of a child seat to the seat back or rear surface of the automotive seat. The tethering system functions to retain a top end of a child seat to the vehicle seat in instances of deceleration of the automotive vehicle.

BACKGROUND OF THE INVENTION

The National Highway Traffic Safety Administration ("NHTSA") has promulgated standards for vehicle occupant protection. Federal Motor Vehicle Safety Standards ("FMVSS") 208, 209 and 210 set the requirements for occupant restraints and FMVSS 213 and 225 set standards for child seats (restraint systems) used in motor vehicles. The need for child seats has been recognized world wide. All 50 states have legislated the mandatory use of child seats. Additionally, certain countries such as Australia and Canada have put forth regulations which require that the child seat be equipped with a tether near the top of the child seat. The tether is attached to a mounting point in a prescribed region of the vehicle to inhibit the child seat from pivoting forward during a sudden deceleration of the vehicle.

It is known that it is inadvisable to use a child seat in a front seat of a vehicle, especially when the vehicle has an inflatable air bag restraint system. Therefore, child seats are best placed in the rear seating of the vehicle. In a conventional passenger car vehicle a child seat with a tethering system will typically connect the child seat top tether to a flat ledge which extends over a vehicle's rear trunk. However, in van type vehicles, most child seat tethering systems place the top tether behind the vehicle seat in which the child seat is mounted on. The top tether is often then attached at various places including the rear sill and upper headers of the vehicle. Such mounting points are disadvantageous because they require that additional holes be provided in the vehicle body. Additional reinforcements to the vehicle body must be provided, adding to the manufacturing costs and complexity of the vehicle. Another disadvantage is a loss of storage space in the vehicle if the tether is anchored to the floor or to other parts of the vehicle body.

Another tethering mounting system has been brought forth in Mar, et al., U.S. Pat. No. 5,941,600, commonly assigned. In Mar, et al. a mounting bar is provided. The mounting bar extends generally adjacent to the floor and transverse to the longitudinal or major axis of the vehicle. First and second mounting brackets are connected with the mounting bar. The brackets are capable of connecting to pre-existing seat attachment points in the vehicle floor. A plurality of tether attachment points are provided on the mounting bar. The tether attachment points are usually defined by holes drilled or punched into the mounting bar. The tether attachment system further includes a retainer in the form of a loop attached to one of the mounting bar attachment points. The position of the retainer on the mounting bar can be adjusted. The mounting brackets include an upper member and a lower member. A plurality of bolts are provided for connecting the upper and lower member to one another. The mounting bracket upper member defines a groove. The lower member of the mounting bracket also defines a groove. When the upper and lower members are connected a generally oval shape is formed.

It is desirable to provide a tethering system for a child seat which does not require such a mounting bracket. It is also desirable to provide a child seat tethering mounting system wherein attachment to the rear sill, floor or "B" or "C" pillar can be avoided.

SUMMARY OF THE INVENTION

To meet the above-noted desires, the revelation of the present invention is brought forth. In a preferred embodiment, the present invention discloses a vehicle seat which has a cushion or bun portion for alternately supporting a seated occupant or a bottom portion of a child seat. The vehicle seat also has a seatback portion. The seatback has a lower end which is connected to the seat cushion portion. The seatback has a forward surface for alternately supporting a back region of a vehicle seat occupant or a seatback of a child seat. The seatback also has a rearward facing surface. In the present application, a connector receptacle is provided. This connector receptacle is recessed into the seatback's rearward facing surface to allow a connector to be attached thereto. The connector is provided to be used with the end of a top tether of a child seat. In most instances, the connector will be a hook and the connector receptacle will include a recessed cross bar.

It is an object of the present invention to provide a vehicle seat which provides an anchoring or connection point for a top tether of a child seat. It is an object of the present invention to provide a child seat mounting system for minivan or van-type vehicles. It is also an object of the present invention to provide a child seat mounting system for light trucks, station wagons and other vehicles, such as hatchbacks with fold-down type seating.

The above-noted and other objects of the present invention will become apparent to those skilled in the art from a review of the invention as provided in the accompanying drawings and detailed description of the preferred embodiment.

BRIEF DESCRIPTION OF THE DRAWINGS

FIG. 5 is a sectional view taken along lines 5—5 of FIG. 4 showing the connection between the seatback and mounting system.

FIG. 6 is an enlarged view of a cross section of a bar portion in FIG. 5.

DETAILED DESCRIPTION OF THE PREFERRED EMBODIMENT

Figure 1:
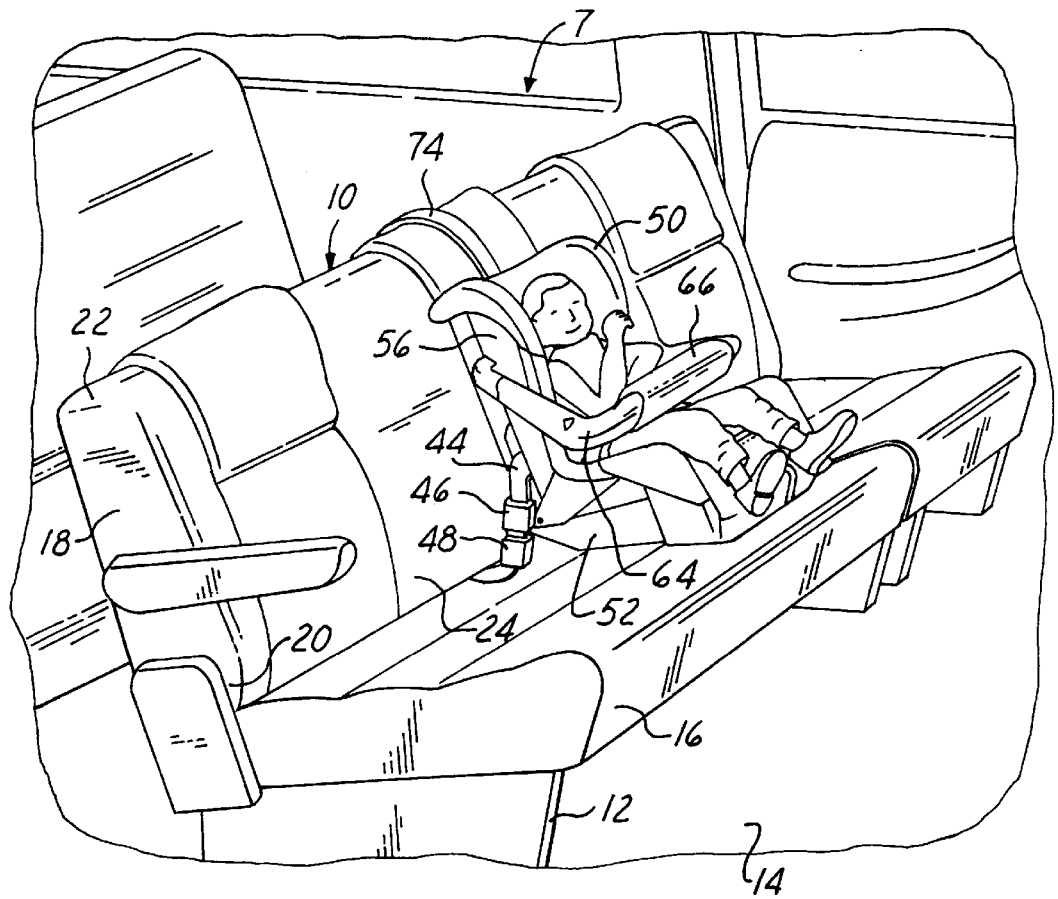
FIG. 1 is a perspective view of a preferred embodiment child seat mounting system according to the present invention utilized in the rearward mid-row seating of a van type vehicle with the child seat installed.
Figure 2:
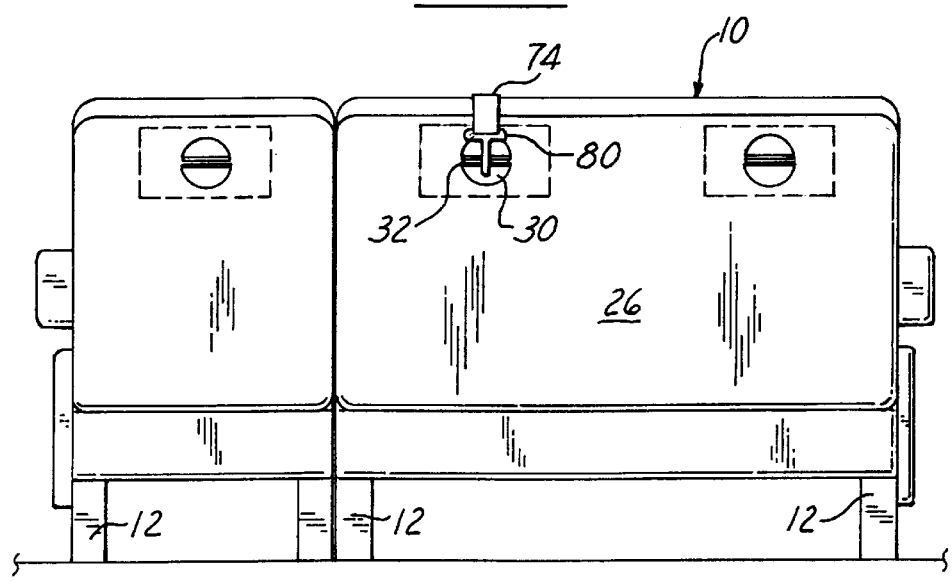
FIG. 2 is a rear plan view of the seating shown in perspective in FIG. 1.

FIGS. 1 through 6 illustrate a preferred embodiment vehicle seat and child seat mounting system according to the present invention. Referring in detail to FIGS. 1 and 2, a vehicle seat 10 is illustrated. Seat 10 is a middle row section type seat such as in a van or minivan type vehicle. The vehicle seat 10 has support stands 12 which are connected to a vehicle floor 14. The vehicle seat 10 may in some instances be positionally adjustable upon the vehicle floor 14, according to vehicle operator desire. Connected above the stands 12 is a vehicle seat bun or cushion portion 16. The vehicle seat cushion portion 16 supports a buttock and thigh region of a seated occupant. Alternatively, the vehicle seat cushion portion 16 may support a lower portion of a child seat as shown.

Figure 3:
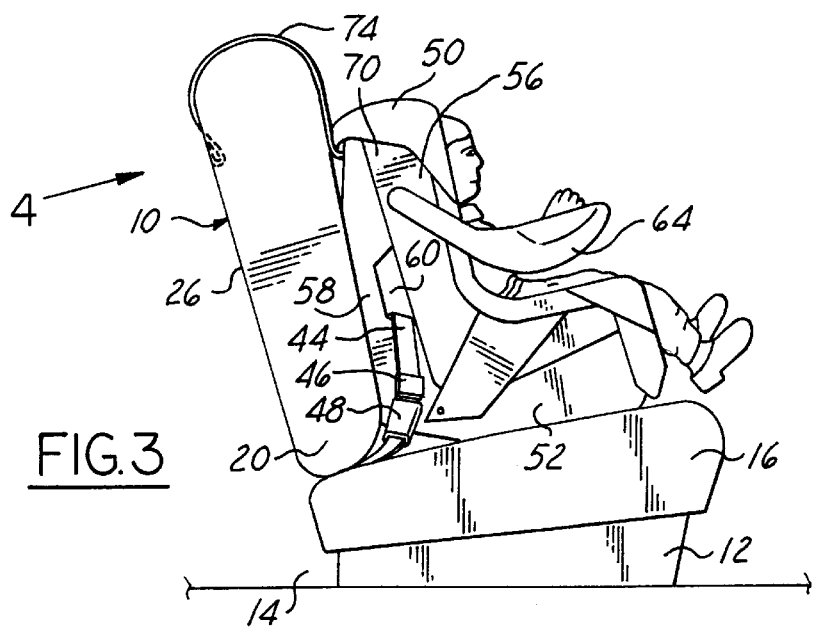
FIG. 3 is a side elevational view of the vehicle seat shown in FIG. 1 with an arm rest of the vehicle seat removed for clarity of illustration.

The vehicle seat 10 also has a seatback portion 18. The seatback 18 has a lower end 20, an upper end 22, and a forward or front surface 24 as seen in FIG. 1. The seatback 18 also has a rear surface 26 as seen in FIG. 2. As can be seen In FIG. 3, the seatback 18 is angled from a normal inclination with respect to the cushion portion 16. This inclination is either fixed or angularly positionally adjustable by a connection mechanism located adjacent lower end 20. The forward surface 24 of the seatback is normally provided to support a back region of a seated occupant. Alternatively, the front surface 24 may support a seatback portion of a child seat. As mentioned previously, the seatback 18 defines a rear surface 26 which surface has a connector receptacle 30 located at its upper half (as best shown on FIGS. 2 and 4). Connector receptacle 30 is recessed therein with respect to surface 26. In other contemplated embodiments of the present invention, connector receptacle 30 may be located anywhere on the rear surface 26. The connector receptacle 30 is a rigid, generally cup-shaped member preferably of steel and having upper and lower edges 30', 30" as best seen in FIG. 5. The edges 30', 30" are aligned with spaced apart tubular metal seat frame members 31' and 31" and are attached thereto by welds 33. In addition, side wall portions 35', 35" of the connector receptacle 30 extend against the frame members 31', 31". Although not shown, the side wall portions 35', 35" may be also welded to the adjacent portions of the framing members 31', 31".

Figure 4:
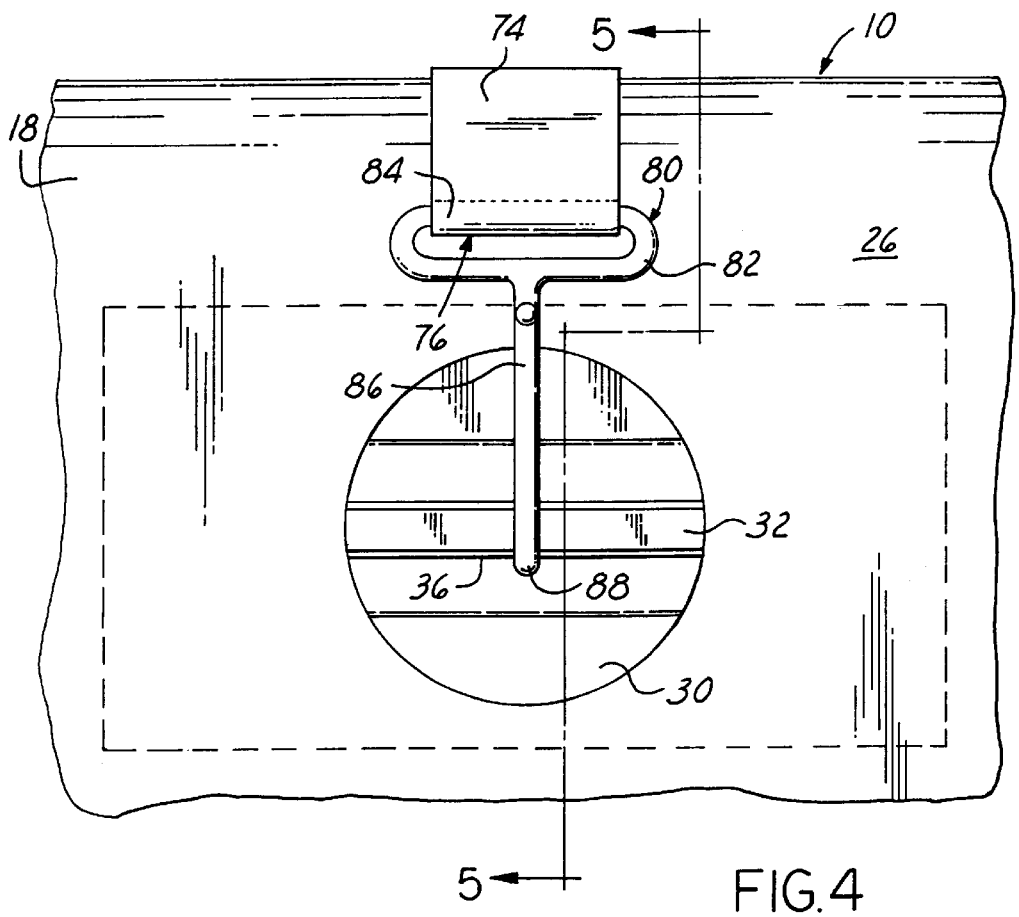
FIG. 4 is an enlargement of a portion of the vehicle seat shown in FIG. 2.

As best shown in FIGS. 2 and 4, the connector receptacle 30 includes a cross bar 32. The cross bar 32 has a non-circular cross sectional area which includes a forward flat 34 and a lower rounded end 36 as seen in FIG. 6. In other embodiments of the present invention the cross bar may simply have a circular cross sectional area. The connector receptacle 30 should extend far enough into the vehicle seatback 18 such that there is sufficient room for a vehicle occupant to reach around the bar 32 and manipulate their fingers so as to work the connector. Thus, the spacing between cross bar 32 and a forward wall 38 of the connector receptacle 30.

Referring back to FIGS. 1 and 3, the vehicle seat 10 includes an associated seatbelt 44 with a male-type buckle 46 and a complementary female-type belt buckle 48 adapted to interconnect to one another as shown. Typically, the seatbelt 44 will be anchored to the vehicle floor 14. The seatbelt 44 may be a conventional lap restraint type only or a three point restraint type belt which incorporates a shoulder restraint (not shown).

In FIGS. 1 and 3, a child restraint or seat 50 is positioned on the vehicle seat 10 and specifically supported on the cushion portion 16 and against the seatback portion 18. The child seat has a lower cushion or bun portion 52 which provides a support for the buttock and thigh region of a seated child or infant. Additionally, the seat cushion or bun portion 52 restrains the child occupant in the lateral direction of the vehicle. Connected with the child seat cushion or bun portion 52 is a child seat seatback potion 56. The seat cushion portion and seatback portion can be fixedly connected or in other embodiments of available child type seats such as a rear facing infant cradle the portions can be detachably connected. However, in such instances, the child safety seat mounting system of this invention need not be materially modified.

As best shown in FIG. 3, the child seat seatback 56 has two generally parallel spaced rearward facing sides or flanges 58 formed with lateral openings 60. The lateral openings 60 allow the seatbelt 44 to pass over the flanges 58 to connect the child safety seat 50 to the vehicle. When so connected, the child seat cushion or bun portion 52 will be positioned adjacent and in overlying relationship to the top of the vehicle seat cushion 16. The child seat 50 has a pivotally mounted armrest 64 connected to the child seat seatback 56. The armrest 64 has a padded region 66 along its front. The armrest 64 serves to restrain the child occupant during deceleration of the vehicle. The pivotal armrest 64 also serves to aid in comfort of the child occupant by also providing support for the child's arms.

Referring to FIGS. 3, 4 and 5 an upper end 70 of the child seat's seatback 56 is connected to an elongated tether 74. In the embodiment shown, tether 74 is of a fixed length but the length of tether 74 may also be adjustable. On the extreme end 76 of the tether 74 a latchable and unlatchable connection device 80 is provided as seen In FIG. 4. In the illustrated embodiment, the connection device is in the form of a hook with a transverse loop portion 82. This loop portion is connected to the tether 74 through a hemmed loop 84 of the tether. A shank portion 86 extends generally downwardly from the loop portion 82 and integrally connects with a bent portion 88 and then a flat or straight end portion 90 forming the hook. The bend 88 meets with the rounded section 36 of the cross bar 32 as best understood by reference to FIG. 6. The straight end portion 90 extends parallel with a flat contact surface 34 of the cross bar 32 to prevent pivotal movement of the connector 80 with respect to the cross bar 32. The connector 80 further includes a spring clip 92 to prevent the disengagement of the hooked end from the cross bar 32. As shown in FIG. 5, the bend 88 of the hook 80 is recessed or located inwardly from the rear surface 26 of the seatback 18.

The operation of the invention is as follows. The vehicle seat 10 is secured to the vehicle floor 14 and the child seat 50 is connected to the vehicle by utilizing the seatbelt 44. The lower cushion or bun portion 52 of the child seat is positioned upon the cushion portion 16 of the vehicle seat assembly 10. The armrest 64 is placed in an upright position. Tether 74 is extended over the seatback 18 and the connector 80 is clipped over bar 32. The length of the tether is adjusted to remove any slack. The child seat 50 is now ready for the child to be positioned therein. The occupant will be positioned into the child seat 50. A child seat belt restraint system integral with the child seat assembly 50 (not shown) is buckled to ensure the proper position of the child in the child seat assembly. The armrest 64 is moved to its lowered position as shown in FIG. 1.

When the subject restraint and attachment system is used in another environment, such as in a utility vehicle having a fold-down seat arrangement, the present invention allows the cargo floor formed by the back side of the seatback to be flat when folded down without any upwardly intrusive device.

The present vehicle child seat mounting system and method have been shown in a preferred embodiment. However, it will be apparent to those skilled in the art that various modifications can be made to the present invention from that as described in the present specification and drawings without departing from the spirit or scope of the present invention as it is encompassed by the disclosure of the specification and drawings and by the following claims.

We claim:

1. A vehicle seat comprising:

a cushion portion for alternately supporting a seated occupant or a bottom portion of a child seat;

a seatback portion having a lower and upper end, said lower end being connected to said seat cushion portion and defining a forward facing surface for alternately supporting a back region of a vehicle seat occupant or a seatback portion of a child seat, said vehicle seat seatback portion also defining a rearward facing surface; and a connector receptacle carried by said seatback portion and being recessed therein with respect to said rearward facing surface to allow attachment of a child seat tether connector, said connector receptacle having an upper edge positioned lower than an extreme upper edge of said seatback portion rearward facing surface.

2. A vehicle seat as described in claim 1 wherein said connector receptacle includes a cross bar and said tether connector is a hook.

3. A vehicle seat as described in claim 2 wherein said cross bar has a non-circular cross sectional shape with a surface adapted to secure said tether connector in a non-twisting position.

4. A vehicle seat as described in claim 1 wherein said connector receptacle is positioned on an upper half of said vehicle seatback portion rearward facing surface.

5. A vehicle child seat restraint system comprising:

a child seat cushion portion for supporting a bottom portion of a child;

a child seat seatback portion having upper and lower end portions, said lower end portion of said child seat seatback portion being connected to said child seat cushion portion, said child seat seatback portion adapted to support a back of a seated child;

an elongated tether with a first end portion connected to said upper end portion of said child seat seatback and a connector device carried on a second end portion of said tether;

a vehicle seat cushion portion for alternately supporting a seated occupant or a lower cushion portion of said child seat;

a vehicle seat seatback portion having lower and upper end portions, said lower end portion being connected to said vehicle seat cushion portion, said vehicle seat seatback portion defining a forward facing surface for alternately supporting a back region of a seated occupant or a seatback portion of said child seat, said vehicle seat seatback portion also defining a rearward facing surface; and a connector receptacle for providing an anchor for the upper portion of the child seat, said connector receptacle being recessed into said rearward facing surface of said vehicle seatback portion to allow said connector device to be attached therewith, said connector receptacle having an upper edge positioned lower than an extreme upper edge of said vehicle seat seatback portion.

6. A vehicle child seat restraint system as described in claim 5 wherein said connector receptacle includes a cross bar and said connector device is a form of a hook attached to the second end portion of said tether.

7. A method for securing a child seat having an upper tether portion in a vehicle comprising:

connecting said child seat assembly upon a cushion portion of a vehicle seat portion and against a vehicle seatback portion by using a vehicle seat belt;

connecting an upper portion of a seat back of said child seat to said vehicle seat back portion by extending the tether portion over an upper end of the vehicle seatback portion;

mounting a recessed connector receptacle in said vehicle seat seatback portion's rear surface with an upper end of said connector receptacle being lower than an extreme upper end of said vehicle seat back portion rear surface; and connecting a latchable connecting device on said tether portion to said recessed connector receptacle recessed in said rear surface of said vehicle seatback portion.

* * * * *